(12) United States Patent
Sitaram et al.

(10) Patent No.: US 9,426,707 B1
(45) Date of Patent: Aug. 23, 2016

(54) HANDOFF BASED ON UPLINK AND DOWNLINK REFERENCE SIGNALS

(71) Applicant: Sprint Spectrum LP, Overland Park, KS (US)

(72) Inventors: Krishna Sitaram, Chantilly, VA (US); Daniel Vivanco, Sterling, VA (US); Chunmei Liu, Great Falls, VA (US)

(73) Assignee: Sprint Spectrum L.P., Overland Park, KS (US)

(*) Notice: Subject to any disclaimer, the term of this patent is extended or adjusted under 35 U.S.C. 154(b) by 106 days.

(21) Appl. No.: 14/226,147

(22) Filed: Mar. 26, 2014

(51) Int. Cl.
*H04W 4/00* (2009.01)
*H04W 36/00* (2009.01)

(52) U.S. Cl.
CPC ................ *H04W 36/0094* (2013.01)

(58) Field of Classification Search
CPC ............ H04Q 7/00; H04Q 7/20; H04L 12/26; H04W 52/16; H04W 4/00
USPC ......... 370/329, 330, 331, 332, 318–321, 333, 370/335–337, 395.4, 395.21; 455/432.1, 455/436–439, 442–444, 452.1, 452.2, 455/132–135, 13.4
See application file for complete search history.

(56) References Cited

U.S. PATENT DOCUMENTS

| | | | | |
|---|---|---|---|---|
| 5,267,261 | A * | 11/1993 | Blakeney, II | H04W 36/30 370/332 |
| 6,603,971 | B1 * | 8/2003 | Mohebbi | H04B 7/022 370/331 |
| 8,099,132 | B2 | 1/2012 | Kim et al. | |
| 8,295,184 | B2 * | 10/2012 | Balasubramanian | H04L 41/5025 370/242 |
| 2012/0087334 | A1 | 4/2012 | Suzuki et al. | |

* cited by examiner

*Primary Examiner* — Hahn N Nguyen

(57) ABSTRACT

A first access node receives, from a wireless device, a first indicator. This first indicator corresponds to a downlink reference signal power as measured by the wireless device. The first indicator is associated with a second access node. The first access node determines a second indicator. The second indicator corresponds to an uplink reference signal power as measured by the first access node. The second indicator is associated with the wireless device. Based on the first indicator and the second indicator, a handoff of the wireless device from the first access node to a second access node is initiated.

17 Claims, 5 Drawing Sheets

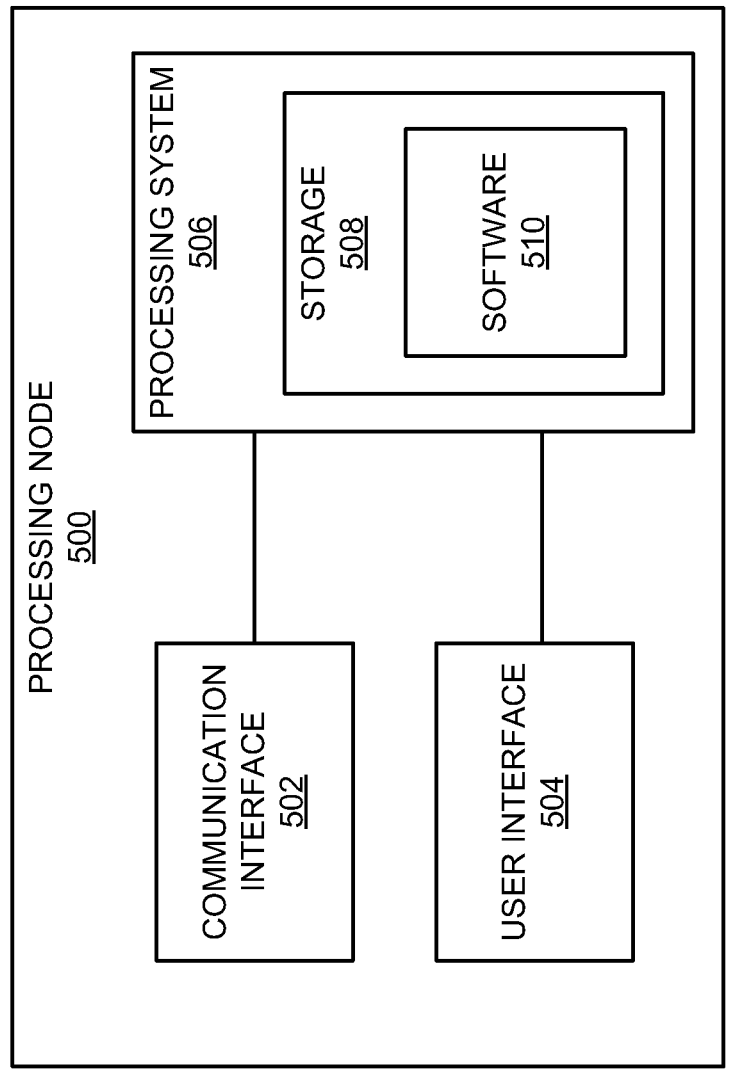

HANDOFF BASED ON UPLINK AND DOWNLINK REFERENCE SIGNALS

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

OVERVIEW

In an embodiment, a first access node receives, from a wireless device, a first indicator. This first indicator corresponds to a first reference signal power as measured by the wireless device. The first indicator is associated with the first access node. The first access node determines a second indicator. The second indicator corresponds to a second reference signal power as measured by the first access node. The second indicator is associated with the wireless device. Based on the first indicator and the second indicator, a handoff of the wireless device from the first access node to a second access node is initiated.

In an embodiment, a first access node is configured to receive a first indicator from a wireless device, and to measure a second indicator associated with the wireless device. The first access node is also configured to initiate a handoff of the wireless device if the first indicator meets a first requirement threshold and the second indicator meets a second requirement threshold. The first indicator corresponds to, as measured by the wireless device, a first received reference signal quality from the first access node. The second indicator corresponds to a second received reference signal quality from the wireless device.

In an embodiment, a first access node measures a first signal quality indicator of a sounding reference signal sent by a wireless device being served by the first access node. The first access node also receives a plurality of measurement reports from the wireless device. These measurement reports include at least a second signal quality indicator and a third signal quality indicator. The second signal quality indicator is associated with reference signals sent by the first access node. The third signal quality indicator is associated with reference signals sent by a second access node. Based on the first signal quality indicator, the second signal quality indicator, and the third signal quality indicator, it is determined whether to initiate a handoff of the wireless device from the first access node to the second access node.

BRIEF DESCRIPTION OF THE DRAWINGS

FIG. 5 illustrates a processing node.

DETAILED DESCRIPTION

In an embodiment, a communication system is configured such that the downlink coverage area and the uplink coverage area for an access node are mismatched. For example, if an access node has boosted its downlink signal power, the access node's downlink coverage area may be larger than its uplink coverage area. In this situation, a wireless device may be located inside the downlink coverage area, but outside of the uplink coverage area. When this happens, the wireless device may not successfully communicate with the access node because it is outside of the access node's uplink coverage area.

To ensure a wireless device can communicate with an access node, or needs to be handed off to another access node, both the downlink reference signals and the uplink reference signals are used to estimate the respective channel characteristics. These uplink and downlink channel characteristics are used to determine whether to initiate a handoff.

For example, both the downlink signal strength as measured by the wireless device, and the uplink signal strength as measured by one or more access nodes can be used to determine whether the wireless device should be handed off to a new access node. This determination can be based on signal strength thresholds. By setting these thresholds appropriately, the system can help ensure that the wireless device is served by an access node having a downlink coverage and an uplink coverage area that both encompass the wireless device.

Figure 1:
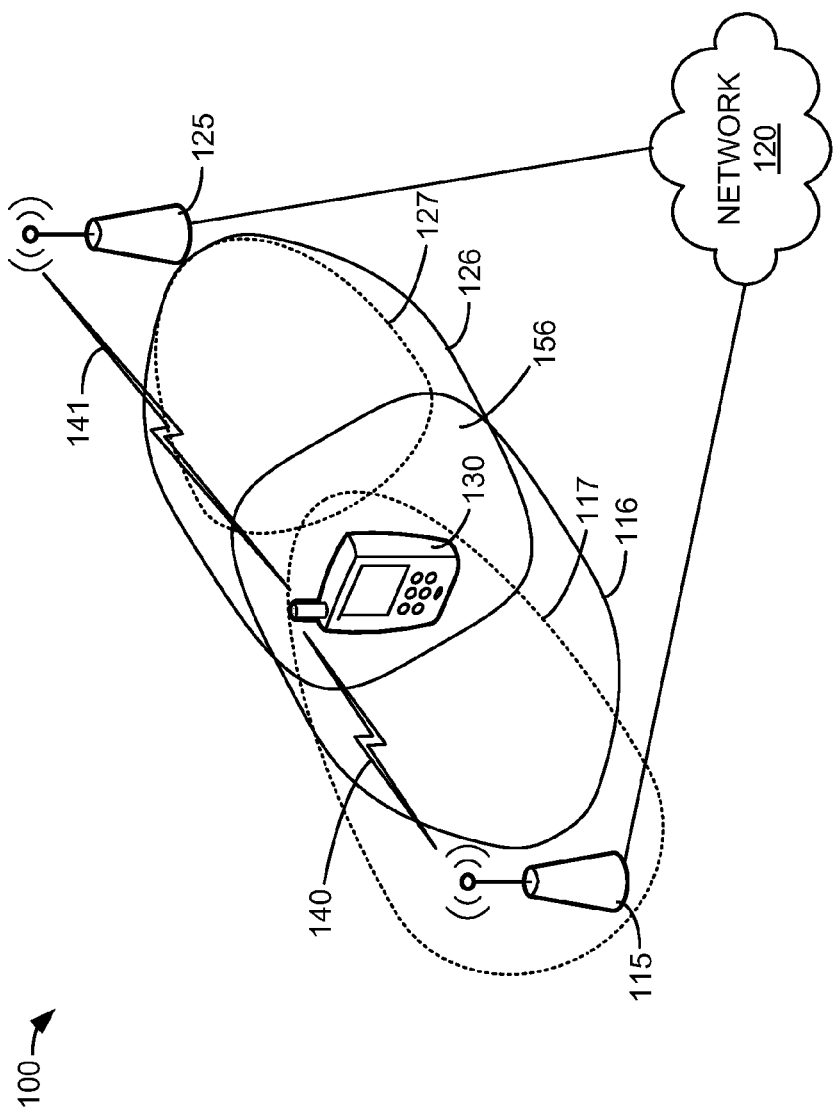
FIG. 1 is a block diagram illustrating a communication system.

FIG. 1 is a block diagram illustrating a communication system. In FIG. 1, communication system 100 comprises access node 115, access node 125, network 120, and wireless device 130. Access node 115 is operatively coupled to network 120. Access node 125 is operatively coupled to network 120. Wireless device 130 is operatively coupled to access node 115 via wireless link 140. Wireless device 130 can be operatively coupled to access node 125 via wireless link 141.

Wireless device 130 can measure a signal strength of access node 115 via wireless link 140 and report this signal strength to access node 115 via wireless link 140. Wireless device 130 can measure the signal strength associated with access node 115 using downlink reference signals transmitted by access node 115. Wireless device 130 can measure a signal strength of access node 125 via wireless link 141 and report this signal strength to access node 115 via wireless link 140.

Wireless device 130 can measure the signal strength associated with access node 125 using downlink reference signals transmitted by access node 125.

Access node 115 can measure a signal strength of wireless device 130 via wireless link 140. Access node 115 can measure the signal strength associated with wireless device 130 using uplink reference signals transmitted by wireless device 130. Access node 125 can measure a signal strength of wireless device 130 via wireless link 141 and report this signal strength to access node 115 via network 120. Access node 125 can measure the signal strength associated with wireless device 130 using uplink reference signals transmitted by wireless device 130.

Access node 115 is illustrated as having downlink coverage area 116 and uplink coverage area 117. Access node 125 is illustrated as having downlink coverage area 126 and uplink coverage area 127. Downlink coverage area 116 and downlink coverage area 126 overlap in region 156. Wireless device 130 is illustrated in region 156. Wireless device 130 is illustrated in uplink coverage area 117, but not in uplink coverage area 127. Thus, it should be understood that wireless device 130 is in a location where it can receive downlink communication served by either access node 115 via wireless link 140 or access node 125 via wireless link 141. However, since wireless device 130 is not in uplink coverage area 127, it should be understood that access node 125 cannot effectively receive uplink communication sent by wireless device 130.

Access node 115 and access node 125 are network nodes capable of providing wireless communication to wireless device 130. Access node 115 and/or access node 125 can be, for example, one or more of a base transceiver station, a radio base station, an eNodeB device, or an enhanced eNodeB device. Access node 115 communicates with wireless device 130 via wireless link 140. Access node 125 can communicate downlink communication with wireless device 130 via wireless link 141.

Communication system 100 is a communication network that can provide wireless communication to wireless devices 130. Network 120 is a communication network that can provide communication between access node 115 and access node 125. Communication system 100 and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 and network 120 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140, and/or wireless link 141 can be a radio frequency, microwave, infrared, or other similar signal. Wireless link 140, and/or wireless link 141 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in network 120, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130 may be any device, system, combination of devices, or other such communication platform capable of communicating wirelessly with access node 115 and access node 125. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 115 and access node 125. Other types of communication platforms are possible.

In an embodiment, wireless device 130 may measure and report one or more indicators of downlink received signal properties that are associated with access node 115 and/or access node 125. These indicators of downlink received signal properties may include, for example, received signal strength (RSSI), reference signal received power (RSRP), and/or signal to interference and noise ratio (SINR). These indicators may be based on downlink reference signals transmitted by access node 115 and/or access node 125. Wireless device 130 may report these indicators to access node 115.

Access node 115 and access node 125 may measure and report one or more indicators of uplink received signal properties that are associated with wireless device 130. These indicators of uplink received signal properties may include, for example, received signal strength (RSSI), reference signal received power (RSRP), and/or signal to interference and noise ratio (SINR). These indicators may be based on uplink reference signals transmitted by wireless device 130. Access node 125 may report these indicators to access node 115 and vice versa.

Based on at least one uplink received signal property, and at least one downlink received signal property, a handoff of wireless device 130 may be initiated. For example, if access node 125 was serving wireless device 130, and handover thresholds associated with both an uplink received signal property and a downlink received signal property are met, then wireless device 130 may be handed-off to access node 115. The access node currently serving wireless device 130 (e.g., access node 125) is considered the "source" access node. The access node that may receive the handed-off wireless device is considered the "target" access node.

In an embodiment, wireless device 130 is handed-off when two conditions are met: (1) the downlink signal quality indicator(s) associated with the target access node, as measured by wireless device 130, meet a first configured threshold; and (2) the uplink signal quality indicator(s) associated with the source access node (e.g., access node 125) meet a second configured threshold. The decision of whether to handoff wireless device 130 may be made by the source access node.

For example, the first condition can be met when the RSRP of the target access node, as measured by wireless device 130, exceeds a configured power level (e.g., −120 dBm). The second condition can be met, for example, when the source access node measures a sounding reference signal (SRS) power level that falls below a configured power level (e.g., −115 dBm). Accordingly, the decision whether to initiate a handoff is based on both a downlink reference signal quality indicator and an uplink reference signal quality indicator.

In an embodiment, additional uplink and/or downlink reference signal quality indicators may be used to determine whether to initiate a handoff. A downlink signal quality indicator(s) associated with the source access node, as measured by wireless device 130, may be used as a factor in the decision of whether to initiate a handoff. For example, the downlink signal quality indicator(s) associated with the source access node may affect the first configured threshold that is to be met by the target access node. In other words, the RSRP of the target access node may be required to exceed the RSRP of the source access node (in addition to condition #2, above) before a handoff is initiated.

In another example, multiple uplink and/or downlink reference signal quality indicators associated with the source and/or target access node may be used to determine whether to initiate a handoff. For example, both the SINR and the RSRP associated with the target access node may need to exceed configured thresholds to meet condition (1), described previously. Likewise, both the SINR and the RSRP associated with the reference signals received by the source access node may need to meet configured thresholds to meet condition (2), described previously.

Figure 2:
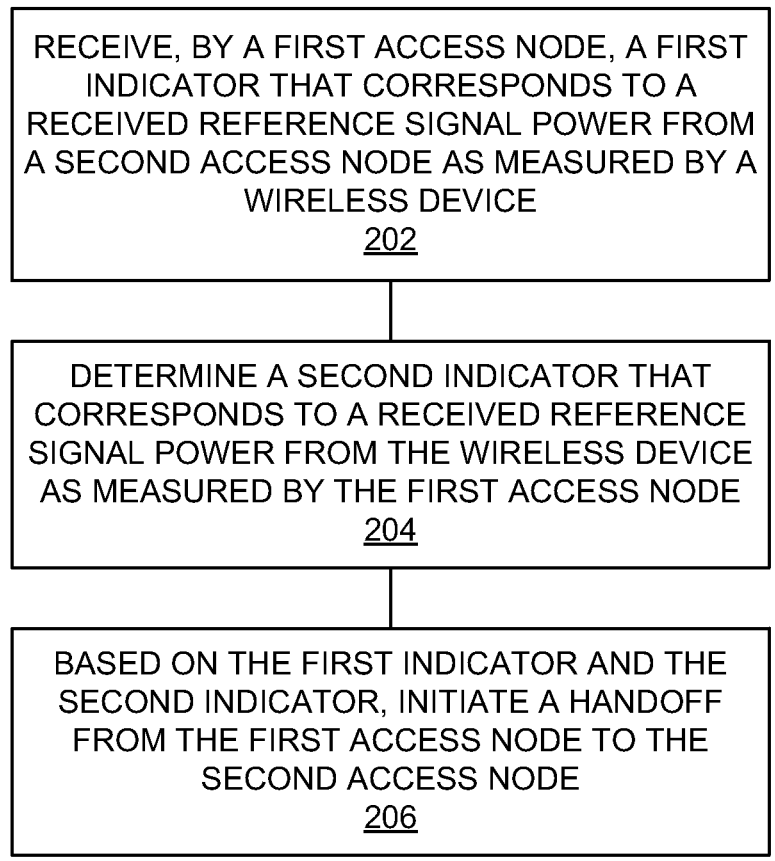
FIG. 2 is a flowchart illustrating a method of operating a communication system.

FIG. 2 is a flowchart illustrating a method of operating a communication system. The steps illustrated in FIG. 2 may be performed by one or more elements of communication system 100. A first access node receives, as measured by a wireless device, a first indicator that corresponds to a received reference signal power from a second access node (202). For example, access node 115 may receive, from wireless device 130, an indicator of the strength of a reference signal from access node 125 being received by wireless device 130.

A second indicator that corresponds to a received reference signal power from the wireless device, as measured by a first access node, is determined (204). For example, access node 115 may measure an indicator of the power of a reference signal received from wireless device 130. The reference signal measured by access node 115 may be a sounding reference signal transmitted by wireless device 130.

Based on the first indicator and the second indicator, a handoff is initiated from the first access node to the second access node (206). For example, based on the strength of signal received by wireless device 130 from access node 125, and the strength of signal received by access node 115 from wireless device 130, access node 115 may determine to initiate a handoff of wireless device 130 from access node 115 to access node 125.

Figure 3:
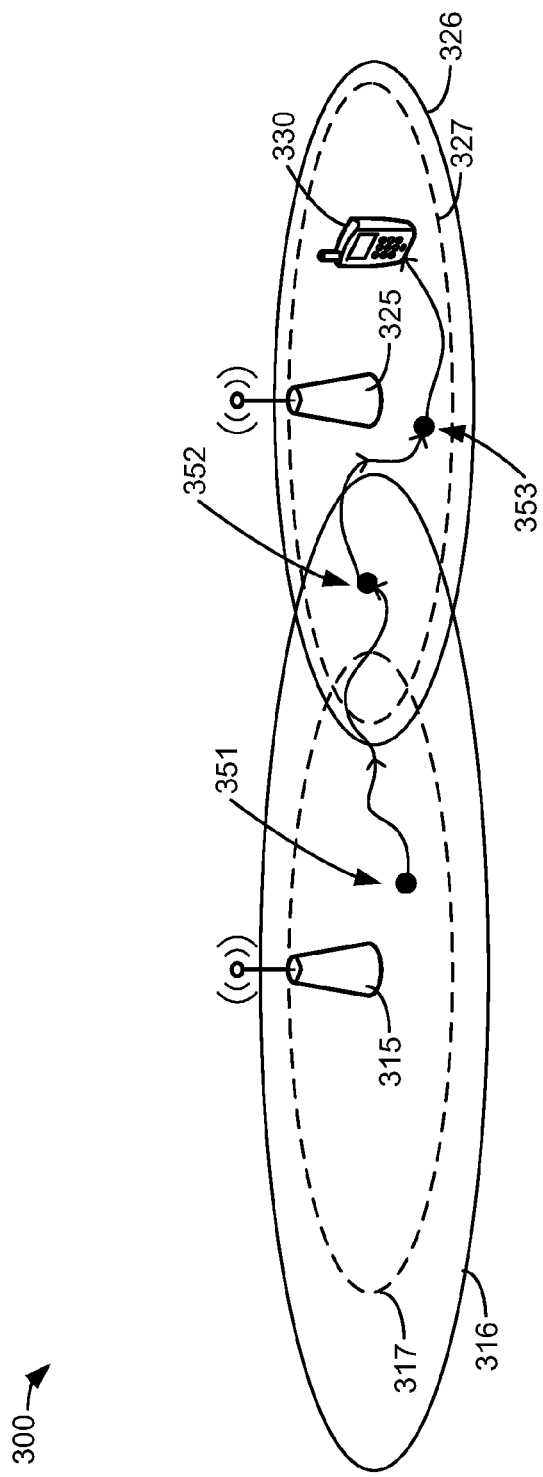
FIG. 3 is a block diagram illustrating a wireless device moving between access node coverage areas.

FIG. 3 is a block diagram illustrating a wireless device moving between access node coverage areas. In FIG. 3, communication system 300 comprises access node 315, access node 325, and wireless device 330. Wireless device 330 can be operatively coupled to access node 315 via a wireless uplink and a wireless downlink. Wireless device 330 can be operatively coupled to access node 325 via a wireless uplink and a wireless downlink.

Access node 315 is illustrated as having downlink coverage area 316 and uplink coverage area 317. Downlink coverage area 316 is illustrated as larger than, and encompassing, uplink coverage area 317. This may be due to an increased transmit power by access node 315 which is used to extend downlink coverage area 316 around access node 315.

Access node 325 is illustrated as having downlink coverage area 326 and uplink coverage area 327. Downlink coverage area 326 is illustrated as approximately the same area as uplink coverage area 327. Downlink coverage area 316 and downlink coverage area 326 are illustrated as overlapping. Uplink coverage area 327 and uplink coverage area are illustrated as overlapping.

In FIG. 3, wireless device 330 is illustrated as starting at position 351, moving to position 352, and then moving to position 353. Position 351 is within downlink coverage area 316 and uplink coverage area 317, but not within either downlink coverage area 326 or uplink coverage area 327. Position 352 is within is downlink coverage area 316, uplink coverage area 317, downlink coverage area 326, and uplink coverage area 327. Position 353 is within downlink coverage area 326 and uplink coverage area 327, but not within either downlink coverage area 316 or uplink coverage area 317.

Access node 315 and access node 325 are network nodes capable of providing wireless communication to wireless device 330. Access node 315 and/or access node 325 can be, for example, one or more of a base transceiver station, a radio base station, an eNodeB device, or an enhanced eNodeB device.

When wireless device 330 is in position 351, wireless device 330 can communicate with access node 315 via both a wireless uplink and a wireless downlink, but wireless device 330 cannot communicate with access node 325. When wireless device 330 is in position 352, wireless device 330 can communicate with access node 315 via only a wireless downlink, but wireless device can communicate with access node 325 via both a wireless uplink and a wireless downlink. When wireless device 330 is in position 353, wireless device 330 can communicate with access node 325 via both a wireless uplink and a wireless downlink, but wireless device 330 cannot communicate with access node 315.

Communication system 300 is a communication network that can provide wireless communication to wireless devices 330. Communication system 300 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 300 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 300 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 300, can be, for example, twisted pair cable, coaxial cable or fiber optic cable, or combinations thereof. Wireless uplinks and/or wireless downlinks can be a radio frequency, microwave, infrared, or other similar signal. These wireless uplinks and/or wireless downlinks can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication to/from wireless device 330 but are omitted for clarity, such as base stations, base station controllers, gateways, mobile switching centers, dispatch application processors, and location registers such as a home location register or visitor location register. Furthermore, other network elements may be present to facilitate communication between among elements of communication system 300 which are omitted for clarity, including additional processing nodes, routers, gateways, and physical and/or wireless data links for carrying data among the various network elements.

Wireless device 330 may be any device, system, combination of devices, or other such communication platform capable of communicating wirelessly with access node 315 and access node 325. Wireless device 330 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 315 and access node 325. Other types of communication platforms are possible.

In an embodiment, as wireless device 330 moves from position 351 to position 352, and from position 352 to position 353, wireless device 330 measures a downlink signal strength indicator associated with a reference signal transmitted by access node 315 and a downlink signal strength indicator associated with the reference signal transmitted by access node 325. Concurrently, access node 315 and access node 325 measure uplink signal strength indicators associated with a reference signal transmitted by wireless device 330. Based on a downlink signal strength indicator, and an uplink signal strength indicator, access node 315 determines whether (and when) wireless device 330 should be handed-off to access node 325.

To illustrate, consider the following example where communication system 300 (and access node 315, in particular) has been configured to initiate a handover of wireless device 330 when wireless device 330 measures a downlink reference signal received power greater than −120 dBm (condition #1) and when access node 315 measures an uplink sounding reference signal power less than −115 dBm (condition #2). In this example, the measured signal powers when wireless device 330 is at each of positions 351, 352, and 353 are summarized in Table 1.

TABLE 1

| | Position 351 | Position 352 | Position 353 |
|---|---|---|---|
| Downlink RSRP measured by access node 315 | −85 dBm | −95 dBm | −119 dBm |
| Downlink RSRP measured by access node 325 | −135 dBm | −115 dBm | −110 dBm |
| Uplink SRS power measured by access node 315 | −90 dBm | −117 dBm | |
| Uplink SRS power measured by access node 325 | | | −100 dBm |

At the start of this example, wireless device 330 is at position 351, wireless and being served by access node 315. At position 351, because the downlink RSRP measured by access node 325 of −135 dBm not greater than −120 dBm, condition #1 is not met. Also at position 351, condition #2 is not met because the uplink SRS power measured by access node 315 of −90 dBm is not less than −115 dBm. Thus, since both condition #1 and condition #2 are not met, a handoff of wireless device 330 from access node 315 to access node 325 would not be initiated.

After wireless device 330 moves to position 352, condition #1 is met because the downlink RSRP measured by access node 325 of −115 dBm is greater than the threshold of −120 dBm. Condition #2 is also met because the uplink SRS power measured by access node 315 of −117 dBm is less than −115 dBm. Thus, since both condition #1 and condition #2 are met, a handoff of wireless device 330 from access node 315 to access node 325 is initiated. Note that after the handoff is completed, access node 325 becomes the source access node and access node 315 becomes the target access node.

After wireless device 330 moves to position 353, condition #1 is met because the downlink RSRP measured by access node 315 (now the target access node) of −119 dBm is greater than −120 dBm. However, condition #2 is not met because the uplink SRS power measured by access node 325 (now the source access node) of −100 dBm is not less than −115 dBm. Thus, since only one of condition #1 and condition #2 are met, a handoff of wireless device 330 from access node 325 back to access node 315 would not be initiated. Note that the same condition #1 and condition #2 can be applied as wireless device 330 moves back to access node 315 (e.g., by moving from position 353 to position 352 and then from position 352 to position 351).

Figure 4:
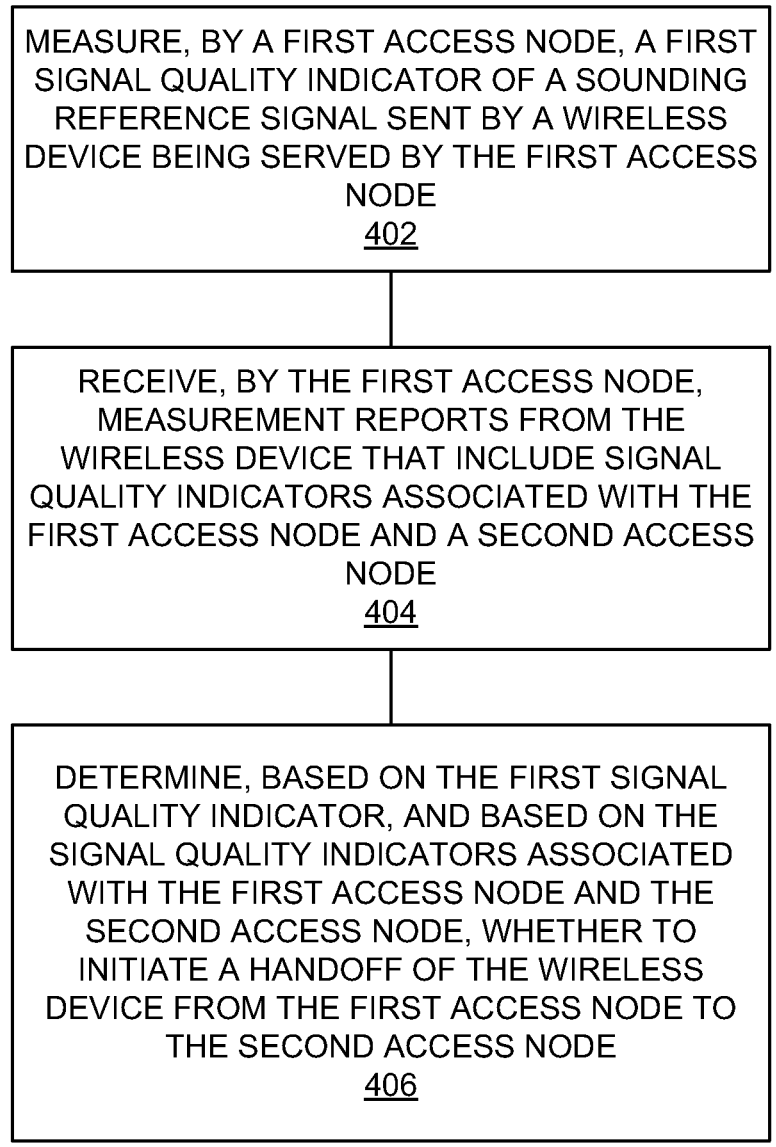
FIG. 4 is a flowchart illustrating a method for initiating a handoff of a wireless device.

FIG. 4 is a flowchart illustrating a method for initiating a handoff of a wireless device. The steps illustrated in FIG. 4 may be performed by one or more elements of communication system 100 and/or communication system 300. A first signal quality indicator of a sounding reference signal sent by a wireless device being served by a first access node is measured by the first access node (402). For example, access node 315, while serving wireless device 330, can measure a power level indicator associated with sounding reference signal transmitted by wireless device 330.

The first access node receives measurement reports from the wireless device that include signal quality indicators associated with the first access node and a second access node (404). For example, access node 315 may receive, from wireless device 330, measurement reports that include indicators of the respective signal strengths being received from access node 315 and access node 325.

Based on the first signal quality indicator, and based on the signal quality indicators associated with the first access node and the second access node, determine whether to initiate a handoff of the wireless device from the first access node to the second access node (406). For example, based on the power level indicator associated with sounding reference signal transmitted by wireless device 330, and the indicators of the respective signal strengths being received from access node 315 and access node 325 received in the measurement reports, access node 315 may determine whether or not to initiate a handoff or wireless device 330 to access node 325.

For example, wireless device 330 may be handed-off when two conditions are met: (1) the downlink signal quality indicator(s) associated with the target access node, as measured by wireless device 130, meet a first configured threshold that is based on the respective signal strengths being received from access node 315 and access node 325 (e.g., when the signal strength being received from access node 325 exceeds the signal strength being received from access node 325 by a predetermined amount); and (2) the power level indicator associated with sounding reference signal transmitted by wireless device 330 meets a second configured threshold.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 300 may be, comprise, or include computers systems and/or processing nodes. This includes, but is not limited to: access node 115, access node 125, access node 315, access node 325, wireless device 130, and/or wireless device 330.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 includes access node 115, access node 125, access node 315, and access node 325. Processing node 500 can also be an adjunct or component of a network element, such as an element of access node 115, network 120, access node 125, access node 315, access node 325, wireless device 130, wireless device 330, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   receiving, by a first access node and from a wireless device, a first signal quality indicator of a first downlink reference signal transmitted by a second access node and measured by the wireless device;
   measuring, by the first access node, a second signal quality indicator of a sounding reference signal transmitted by the wireless device and received at the first access node; and
   in response to the first signal quality indicator exceeding a first threshold requirement and the second signal quality indicator falling below a second threshold requirement, initiating a handoff of the wireless device from the first access node to the second access node.

2. The method of claim 1, wherein said initiating said handoff of the wireless device is further based on a third signal quality indicator of a second downlink reference signal transmitted by the first access node and measured by the wireless device.

3. The method of claim 2, further comprising:
   receiving, by a first access node and from a wireless device, a fourth signal quality indicator of the first downlink reference signal transmitted by the second access node and measured by the wireless device.

4. The method of claim 3, wherein the fourth signal quality indicator is a measured signal to interference and noise ratio (SINR).

5. The method of claim 3, wherein said initiating said handoff of the wireless device is in response to said first signal quality indicator exceeding said third signal quality indicator.

6. The method of claim 5, wherein said initiating said handoff of the wireless device is further in response to said fourth signal quality indicator meeting a third requirement threshold.

7. A communication system, comprising:
   a first access node configured to receive a first signal quality indicator of a first downlink reference signal transmitted by a second access node and measured at a wireless device, to measure a second signal quality indicator of a sounding reference signal transmitted by the wireless device, and to initiate a handoff of the wireless device if the first signal quality indicator exceeds a first requirement threshold and the second signal quality indicator falls below a second requirement threshold.

8. The communication system of claim 7, wherein the communication system is configured to receive a third signal quality indicator of a second downlink reference signal transmitted by the first access node and measured at the wireless device.

9. The communication system of claim 8, wherein the first signal quality indicator meeting said first requirement threshold includes said first signal quality indicator exceeding said third signal quality indicator.

10. The communication system of claim 9, wherein said first signal quality indicator is based on a received reference signal power.

11. The communication system of claim 9, wherein said first signal quality indicator is based on a received signal-to-noise ratio.

12. The communication system of claim 9, wherein said second signal quality indicator is based on a received reference signal power.

13. The communication system of claim 9, wherein said first signal quality indicator is based on a received signal-to-noise ratio.

14. A method of operating a communication system, comprising:

measuring, by a first access node, a first signal quality indicator of a sounding reference signal sent by a wireless device being served by the first access node;

receiving, by the first access node, a plurality of measurement reports from the wireless device, the measurement reports including a second signal quality indicator and a third signal quality indicator, the second signal quality indicator associated with reference signals sent by the first access node, the third signal quality indicator associated with reference signals sent by a second access node; and, upon the first signal quality indicator falling below a first requirement threshold, and the third signal quality indicator exceeding the second signal quality indicator, initiating a handoff of the wireless device from the first access node to the second access node.

15. The method of claim 14, wherein the second signal quality indicator corresponds to a received signal power of the reference signals sent by the first access node and the third signal quality indicator corresponds to a received signal power of the reference signals sent by the second access node.

16. The method of claim 14, wherein the first signal quality indicator corresponds to a received signal power of the sounding reference signal.

17. The method of claim 14, wherein the second signal quality indicator is based on a received signal power indicator and a received signal-to-noise ratio indicator.

* * * * *